United States Patent
Bulancea (10) Patent No.: US 9,496,696 B2
(45) Date of Patent: Nov. 15, 2016

(54) WEATHER RESISTANT FLIP LID COVER WITH IMPROVED SEALING ARRANGEMENT

(71) Applicant: Marian Bulancea, Middle Village, NY (US)

(72) Inventor: Marian Bulancea, Middle Village, NY (US)

(73) Assignee: Leviton Manufacturing Co., Inc., Melville, NY (US)

( * ) Notice: Subject to any disclaimer, the term of this patent is extended or adjusted under 35 U.S.C. 154(b) by 151 days.

(21) Appl. No.: 14/493,643

(22) Filed: Sep. 23, 2014

(65) Prior Publication Data

US 2016/0072266 A1   Mar. 10, 2016

Related U.S. Application Data

(60) Provisional application No. 62/045,909, filed on Sep. 4, 2014.

(51) Int. Cl.
*H02G 3/14* (2006.01)
*H02G 3/08* (2006.01)

(52) U.S. Cl.
CPC ............ *H02G 3/088* (2013.01); *H02G 3/14* (2013.01)

(58) Field of Classification Search
CPC .......... H02G 3/088; H02G 3/14; H02G 3/10; H02G 3/081; H02G 3/08; H01R 13/5213; H01R 13/5219; H01H 9/02; H01H 9/04
USPC ...... 174/50, 53, 57, 58, 66, 67; 220/3.2–3.9, 220/4.02, 241, 242
See application file for complete search history.

(56) References Cited

U.S. PATENT DOCUMENTS

| | | |
|---|---|---|
| 2,963,536 A | 12/1960 | Kokalas |
| 2,984,725 A | 5/1961 | Hubbell |
| 3,120,987 A | 2/1964 | Degnan |
| 3,167,374 A | 1/1965 | Healey |
| 3,188,438 A | 6/1965 | Lovasco |
| 3,288,910 A | 11/1966 | Zerwes |
| 3,611,255 A | 10/1971 | Shroyer |
| 3,792,415 A | 2/1974 | Fuller |
| 3,928,742 A | 12/1975 | Rule |
| 3,967,085 A | 6/1976 | Lockard et al. |
| 4,063,793 A | 12/1977 | Judd |
| 4,114,974 A | 9/1978 | Lawrence |
| 4,145,075 A | 3/1979 | Holzmann |
| 4,250,348 A | 2/1981 | Kitagawa |

(Continued)

OTHER PUBLICATIONS

Leviton Manufacturing Co., Inc. "Watertight Wiring Devices", Wetguard Brochure (2013).

*Primary Examiner* — Angel R Estrada (57) ABSTRACT

A weather resistant flip lid cover for an electrical box or connector preferably includes first and second seals. A hinge pivotally couples the flip lid cover to the electrical box or connector. The first and second seals are preferably concentric. When the flip lid cover is in a closed position the first and second seals engage first and second sealing surfaces on the electrical box or connector to form a seal that complies with the requirements of NEMA Type 4, Type 12, and/or IP66. The first seal is preferably a V-ring. The biasing force of the flip lid cover is preferably sufficient to form a weather resistant seal. The seals may form an inner air chamber therebetween so that when the flip lid cover is moved to the closed position a pressure in the inner compartment is increased and presses a lip of the V-ring against the first sealing surface.

23 Claims, 7 Drawing Sheets

(56) References Cited

U.S. PATENT DOCUMENTS

| | | | |
|---|---|---|---|
| 4,265,365 A | 5/1981 | Boteler | |
| 4,343,411 A | 8/1982 | Chesnut et al. | |
| 4,456,145 A * | 6/1984 | Frank | H02G 3/14 |
| | | | 220/242 |
| 4,484,021 A | 11/1984 | Schaefer et al. | |
| 4,505,403 A | 3/1985 | Bowden, Jr. et al. | |
| 4,533,194 A | 8/1985 | Boichut et al. | |
| 4,567,544 A | 1/1986 | Ronemus et al. | |
| 4,803,307 A | 2/1989 | Shotey | |
| 5,317,108 A | 5/1994 | Prairie, Jr. | |
| 5,456,377 A | 10/1995 | Williams, Jr. | |
| 5,470,248 A | 11/1995 | Wood | |
| D368,250 S | 3/1996 | Castaldo | |
| 5,527,993 A | 6/1996 | Shotey et al. | |
| 5,541,363 A | 7/1996 | Weise et al. | |
| 5,571,023 A * | 11/1996 | Anthony | H02G 3/14 |
| | | | 220/242 |
| 5,574,254 A | 11/1996 | Mori et al. | |
| 5,575,380 A | 11/1996 | Imai | |
| 5,712,450 A | 1/1998 | Chan et al. | |
| 5,741,149 A | 4/1998 | Anthony | |
| 5,744,754 A | 4/1998 | Strang et al. | |
| 5,800,188 A * | 9/1998 | Barber | H01R 13/5213 |
| | | | 220/242 |
| 5,857,873 A | 1/1999 | Castaldo | |
| 5,863,221 A | 1/1999 | Castaldo | |
| 6,017,243 A | 1/2000 | Castaldo | |
| 6,028,268 A | 2/2000 | Stark et al. | |
| 6,051,786 A | 4/2000 | Gretz | |
| 6,132,227 A | 10/2000 | Boteler et al. | |
| 6,355,882 B1 | 3/2002 | Gretz | |
| 6,476,321 B1 | 11/2002 | Shotey et al. | |
| 6,605,781 B2 | 8/2003 | Milanowski et al. | |
| 6,674,031 B1 * | 1/2004 | Flegel | H01R 13/5213 |
| | | | 174/53 |
| 6,737,575 B2 | 5/2004 | Pyron | |
| 6,737,576 B1 | 5/2004 | Dinh | |
| 6,743,981 B2 | 6/2004 | Miyakoshi | |
| 6,822,161 B2 | 11/2004 | Komatsu et al. | |
| 6,831,222 B2 | 12/2004 | Pastuch | |
| 6,840,785 B2 | 1/2005 | Drane | |
| 6,956,176 B2 | 10/2005 | Castaldo | |
| 6,982,381 B1 | 1/2006 | Backofen et al. | |
| 7,029,328 B1 | 4/2006 | Mckenzie et al. | |
| 7,075,003 B2 | 7/2006 | Johnson et al. | |
| 7,148,421 B2 * | 12/2006 | Nagashima | H02G 3/14 |
| | | | 174/66 |
| 7,151,221 B1 | 12/2006 | Backofen et al. | |
| 7,227,079 B2 | 6/2007 | Noest et al. | |
| 7,258,556 B1 | 8/2007 | Boutros et al. | |
| 7,259,328 B1 | 8/2007 | Gretz | |
| 7,259,337 B1 | 8/2007 | Gretz | |
| 7,285,014 B2 | 10/2007 | Castaldo et al. | |
| 7,301,100 B2 | 11/2007 | Drane et al. | |
| 7,381,894 B1 | 6/2008 | Shotey et al. | |
| 7,396,997 B2 | 7/2008 | Dinh | |
| 7,410,372 B2 | 8/2008 | Johnson et al. | |
| 7,449,634 B1 | 11/2008 | Shotey et al. | |
| 7,476,806 B2 | 1/2009 | Dinh | |
| 7,484,973 B2 | 2/2009 | Westhoff | |
| 7,538,272 B1 | 5/2009 | Shotey et al. | |
| 7,554,033 B1 | 6/2009 | Bhosale et al. | |
| 7,598,453 B1 | 10/2009 | Shotey et al. | |
| 7,619,162 B2 | 11/2009 | Dinh et al. | |
| 7,645,937 B2 | 1/2010 | Bhosale | |
| 7,709,735 B2 | 5/2010 | Vigorito et al. | |
| 7,728,226 B2 | 6/2010 | Drane et al. | |
| 7,732,709 B2 | 6/2010 | Puri et al. | |
| 7,763,799 B2 | 7/2010 | Johnson | |
| 8,497,424 B2 | 7/2013 | Castaldo | |
| 8,618,416 B2 * | 12/2013 | Rothbaurer | H01R 13/5213 |
| | | | 174/66 |
| 8,847,071 B2 | 9/2014 | Castaldo | |
| 2006/0037773 A1 | 2/2006 | Castaldo et al. | |
| 2008/0179072 A1 | 7/2008 | Drane et al. | |
| 2009/0078441 A1 | 3/2009 | Drane | |
| 2009/0078442 A1 | 3/2009 | Lin et al. | |

* cited by examiner

WEATHER RESISTANT FLIP LID COVER WITH IMPROVED SEALING ARRANGEMENT

CROSS-REFERENCE TO RELATED APPLICATION

This is a non-provisional application claiming priority to U.S. Provisional Patent Application Ser. No. 62/045,909, filed Sep. 4, 2014, the entirety of which provisional application is incorporated herein by reference.

FIELD OF THE DISCLOSURE

The present disclosure relates generally to weather resistant coverings for electrical boxes or connectors complying with various commercial and military standards, and more particularly to an improved sealing arrangement for use with such weather resistant coverings.

BACKGROUND OF THE DISCLOSURE

Weather resistant covers are often employed to protect electrical devices, such as receptacles, plugs and connectors that are exposed to the harsh elements of weather, such as moisture, rain, snow, and the like. Weather resistant covers are often also used to protect electrical devices, such as receptacles, plugs and connectors, located indoors in industrial facilities, and the like, which can also experience high moisture conditions, such as when surfaces are sprayed or hosed down for cleaning, and which may be exposed to unwanted contaminants, such as dust.

Weather resistant covers can be used in conjunction with electrical boxes or other housings (collectively "boxes") to protectively enclose a variety of electrical and/or optical (i.e., fiber optic) devices when one or more electrical wiring devices of the box are either in use or not in use. Such boxes often contain one or more electrical receptacles or connectors to which power cabling can be removably connected using a standard plug arrangement as is readily known by one of ordinary skill in the art. To gain access to the receptacle or connector the weather resistant cover can be opened or removed, such as by unlatching or unscrewing, and an electrical connection can be made to the electrical receptacle or connector via the plug. When the electrical connection is no longer required, the plug is removed and the cover is closed or reattached to the box, providing protection from moisture, weather and unwanted contaminants.

The National Electrical Manufacturers Association (NEMA) provides standards for protection provided by certain enclosure "types." For example, a NEMA Type 3 enclosure must provide protection from ingress of water such as rain, sleet and snow. A NEMA Type 4 enclosure must provide protection from the ingress of water such as rain, sleet, snow, and in addition must provide protection against splashing water and hose directed water. A NEMA Type 12 enclosure must provide protection from the ingress of dirt, circulating dust, lint, fibers and flyings. The International Electrotechnical Commission (IEC) also provides standards for protection of enclosures. For example, an enclosure meeting the IEC's International Protection (IP) Code IP66 must provide complete protection from dust, oil and other non-corrosive material, as well as protection from powerful jets of water.

To comply with NEMA Type 4, Type 12, and/or IP66 requirements, some weather resistant covers include a threaded cap that mates with threads formed on the electrical box or connector so that the cap can be screwably coupled to the cover. Other weather resistant covers include a flip lid that is hinged to the box. The flip lid is pivotable between an open configuration to expose the electrical receptacle or connector, and a closed configuration when the electrical receptacle or connector is not in use. In some weather resistant covers, a gasket may be provided in the lid to engage a surface of the box to provide a seal therebetween. Because the lid often has a limited range of movement through which the gasket can be compressed, such arrangements may generally not be able to provide a desired degree of sealing (i.e., NEMA Type 3, Type 4, Type 12, or IP66). This is because the lid compresses the gasket via a swinging movement (and not a perfectly axial movement), and as such the gasket may be adequately compressed only on one side of the lid, and may not experience sufficient compression on the opposite side of the lid. Thus, with current flip-lids that are hinged to the box, a gap can be present between the lid and the gasket when the lid is in a closed position (i.e., when the lid covers the receptacle). As a result, under extreme conditions moisture or fluid can leak past the gasket on the side opposite the hinge. This effect can be magnified due to manufacturing tolerances. To combat this, hinged lid type covers often include an affirmative latch or locking mechanism that requires the user to press down on the lid to fully engage the gasket and lock the lid to the box.

As can be appreciated, problems exist with the aforementioned cover designs because they require affirmative user action in order to effect a weather resistant seal that complies with NEMA Type 3, Type 4, Type 12, and/or IP-66 requirements. With the threaded cap design it has been found that users often fail to re-attach (i.e., re-thread) the cap after using the receptacle or connector. With the flip lid design, it has been found that users may not re-latch the lid to adequately compress the gasket. In both instances the electrical connections may not be protected from the environment or may be limited to a NEMA Type 3 rating.

Accordingly, it would be desirable to provide a weather resistant cover having a sealing arrangement that results in a desired high degree of moisture and water resistance (e.g., complying with NEMA Type 4 and IP66) as well as dust protection (e.g., complying with NEMA Type 12) with minimal user action.

SUMMARY OF THE DISCLOSURE

A weather resistant covering for an electrical box or connector is disclosed. The covering preferably includes a flip lid cover having first and second seal recesses for receiving first and second seals, respectively. The flip lid cover preferably also includes a hinge for pivotably coupling to a portion of an electrical box or connector. The first seal recess may have a first radius that is smaller than a radius of the second seal recess such that the first and second seal recesses are concentric. When the flip lid cover is in a closed configuration or position the first (i.e., principal) seal and the second seal contact first and second sealing surfaces, respectively, formed on the electrical box or connector. The first seal is preferably a V-ring.

A weather resistant covering is disclosed for an electrical box or connector. The covering may include a flip lid cover having first and second seal recesses for receiving first and second seals, respectively. The first seal is preferably a V-ring. The flip lid cover may also comprise a hinge for pivotably coupling to a portion of an electrical wiring device. In use, the flip lid cover is rotatable about the hinge to assume a closed configuration with respect to the electrical box or connector. The first and second seals are engageable with respective first and second sealing surfaces of the electrical box or connector. The flip lid cover may be biased to form a seal between the V-ring and the first sealing surface such that water is prevented from entering the electrical box or connector.

A weather resistant covering is disclosed for an electrical box or connector. The covering may include a flip lid cover comprising first and second concentric seal recesses for receiving first and second seals, respectively. The first seal is preferably a V-ring. The flip lid cover may further include a hinge for pivotably coupling to a portion of an electrical box or connector such that the flip lid cover is movable between an open configuration and a closed position with respect to the electrical box or connector. Thus arranged, when the flip lid cover is configured in the closed configuration the first and second seals are engageable with respective first and second sealing surfaces of the electrical box or connector to form an inner air chamber therebetween. When the flip lid cover is moved from the open configuration to the closed configuration a pressure in the inner air chamber may be increased to thereby cause a lip of the V-ring to press against the first sealing surface.

BRIEF DESCRIPTION OF THE DRAWINGS

By way of example, a specific embodiment of the disclosed device will now be described, with reference to the accompanying drawings, in which.

DETAILED DESCRIPTION

A weather resistant flip lid cover is disclosed for use with an electrical box or connector. The flip lid cover is configured to provide a desired degree of sealing when the plug is no longer inserted. In one non-limiting embodiment, the flip lid cover is self-returning via a spring force with the spring force providing a sealing force between the flip lid cover and the electrical box or connector sufficient to meet NEMA Type 4, Type 12, and/or IP66 requirements. In other embodiments, the biasing force provided by the weight of the flip lid cover alone can be sufficient to provide a sealing force between the flip lid cover and the electrical box or connector sufficient to meet NEMA Type 4, Type 12, and/or IP66 requirements.

The flip lid cover may include one or more sealing elements for sealing against one or more opposing surfaces of the electrical box or connector. In one non-limiting exemplary embodiment the flip lid cover includes a first sealing element, preferably, a V-ring for sealing against an opposing surface of the electrical box or connector. In another embodiment, the flip lid cover includes a second sealing element, preferably, an X-ring or O-ring, positioned concentric with the first sealing element. In use, the second sealing element (e.g., the X-ring or O-ring) may limit ingress of water when the flip lid is in a closed position, and may also provide a silencing effect (i.e., prevents metal-to-metal contact) when the flip lid cover closes. The first sealing element (e.g., the V-ring) may provide a desired high degree of sealing from any water, moisture or particulate material that is not kept out by the second sealing element (e.g., O-ring or X-ring).

In some embodiments, the first sealing element (e.g., the V-ring) can be configured and arranged within the flip lid cover such that pressure of any water passing the second sealing element (e.g., O-ring or X-ring) forces the first sealing element (e.g., the V-ring) into further engagement with an opposing sealing surface of the electrical box or connector, thus enhancing the sealing action. In some embodiments, the action of closing the flip lid cover can cause an internal air chamber portion of the device to be slightly pressurized, thereby expanding the first sealing element (e.g., the V-ring) into engagement with the opposing sealing surface of the electrical box or connector, and enhancing the sealing action.

Figure 1:
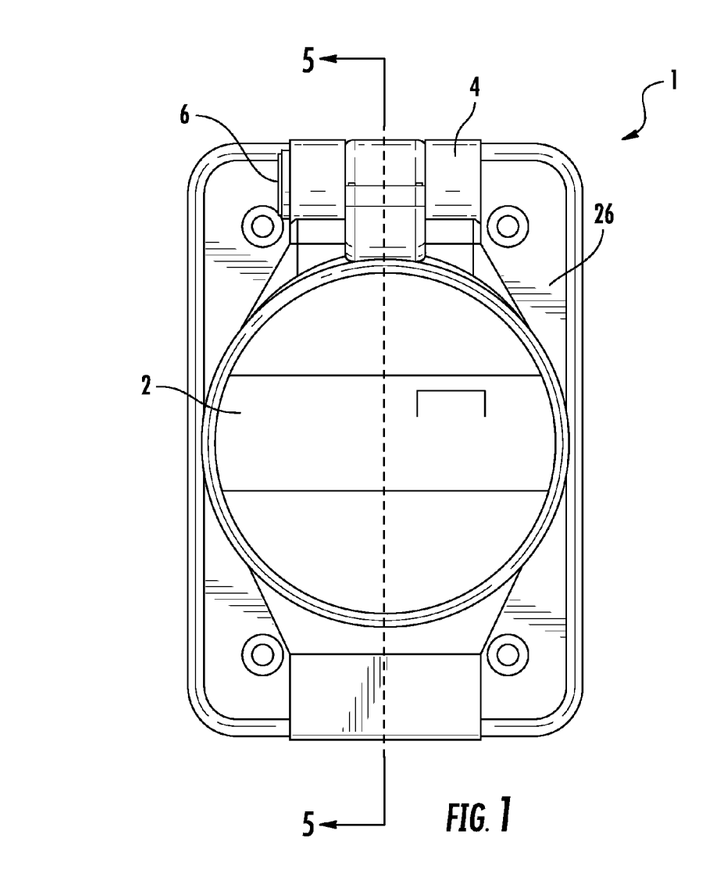
FIG. 1 is a front view of an embodiment of an exemplary electrical box including the disclosed weather resistant flip lid cover.
Figure 2:
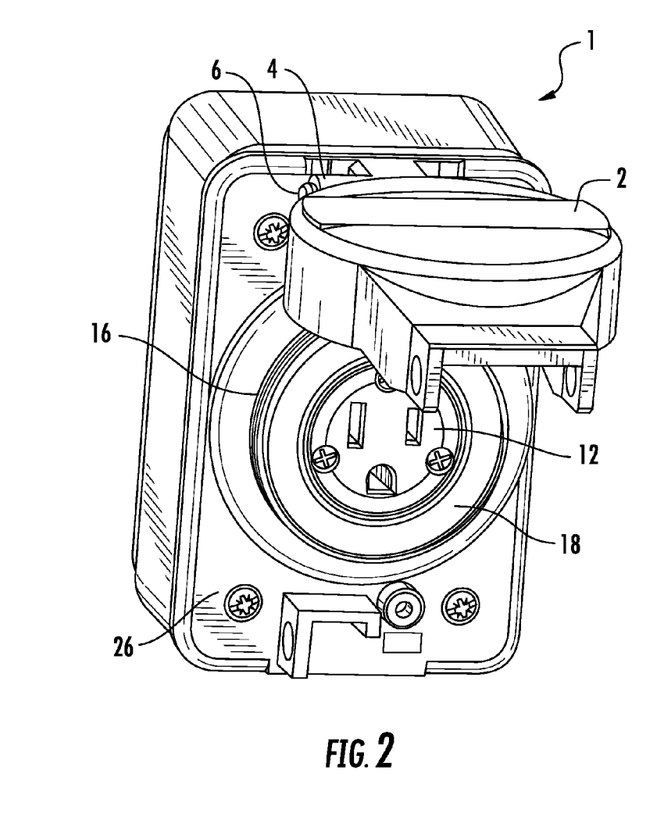
FIG. 2 is a perspective view of the electrical box of FIG. 1.

Referring now to FIGS. 1 and 2, an exemplary device, which in the illustrated embodiment is an electrical box 1, is shown including the disclosed weather resistant flip lid cover 2. It will be appreciated that although the disclosure will proceed in relation to an electrical box 1, the disclosed flip lid cover 2 and its sealing arrangement is not so limited, and can be employed with any of a variety of wiring devices, a non-limiting exemplary listing of which includes electrical receptacles, plug and connector electrical devices, electrical and optical connectors for various applications and in accordance with various commercial and military standards. It will also be appreciated that the disclosed flip lid cover can find application in other fields as well, such as for providing weather resistance to mechanisms such as keyholes and the like. The flip lid cover 2 can be pivotably engaged with the electrical box 1 via a hinge 4, which in the illustrated embodiment includes a pin 6 received within respective recesses 8, 10 (see FIG. 9) of the electrical box and the flip lid cover 2. FIG. 1 shows the flip lid cover 2 in a closed configuration in which the electrical receptacle is not in use and the flip lid cover is rotated about the hinge 4 into sealing engagement with the electrical box 1. FIG. 2 shows the flip lid cover 2 in an open configuration in which the flip lid cover 2 is rotated away from the electrical box 1 about the hinge 4 so that a receptacle 12 of the electrical box is accessible. The receptacle 12 may be any of a variety of electrical receptacles known in the art, the size and type of which is used depending on the specifics of the application. As can be seen, the receptacle 12 may be surrounded by a raised face constituting a first sealing surface 18. This first sealing surface 18, in turn, can be surrounded by an externally threaded portion 16.

Figure 3:
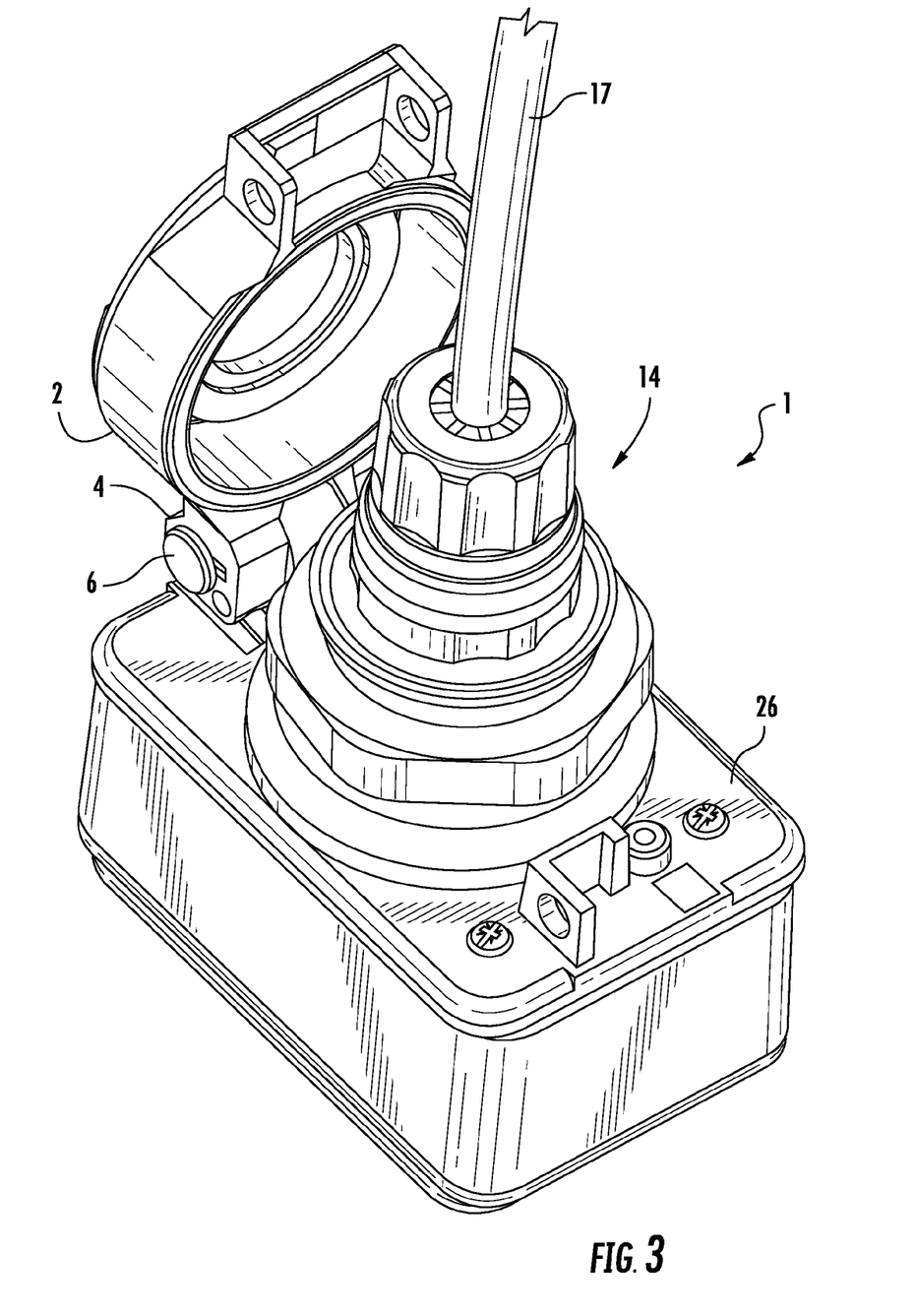
FIG. 3 is a perspective view of the electrical box of FIG. 1 coupled to an electrical plug.

FIG. 3 shows the flip lid cover 2 positioned in the open configuration such that an electrical plug 14 and an electrical wire 17 are connected to the receptacle 12 of the electrical box 1. In the illustrated embodiment, the electrical plug 14 includes threads, preferably internal threads (not shown) configured to threadably engage the externally threaded portion 16 (see FIG. 2) that surrounds the first sealing surface 18 of the electrical box 1. This threaded connection can provide a degree of strain relief to the electrical plug 14 and can prevent accidental uncoupling of the plug from the receptacle. The threaded connection can also provide protection of the electrical connection from the elements such as water, dust and the like when the flip lid cover 2 is in the opened configuration. It will be appreciated, however, that such a threaded portion 16 is not required with the disclosed arrangement, and thus is not necessary.

Figure 4:
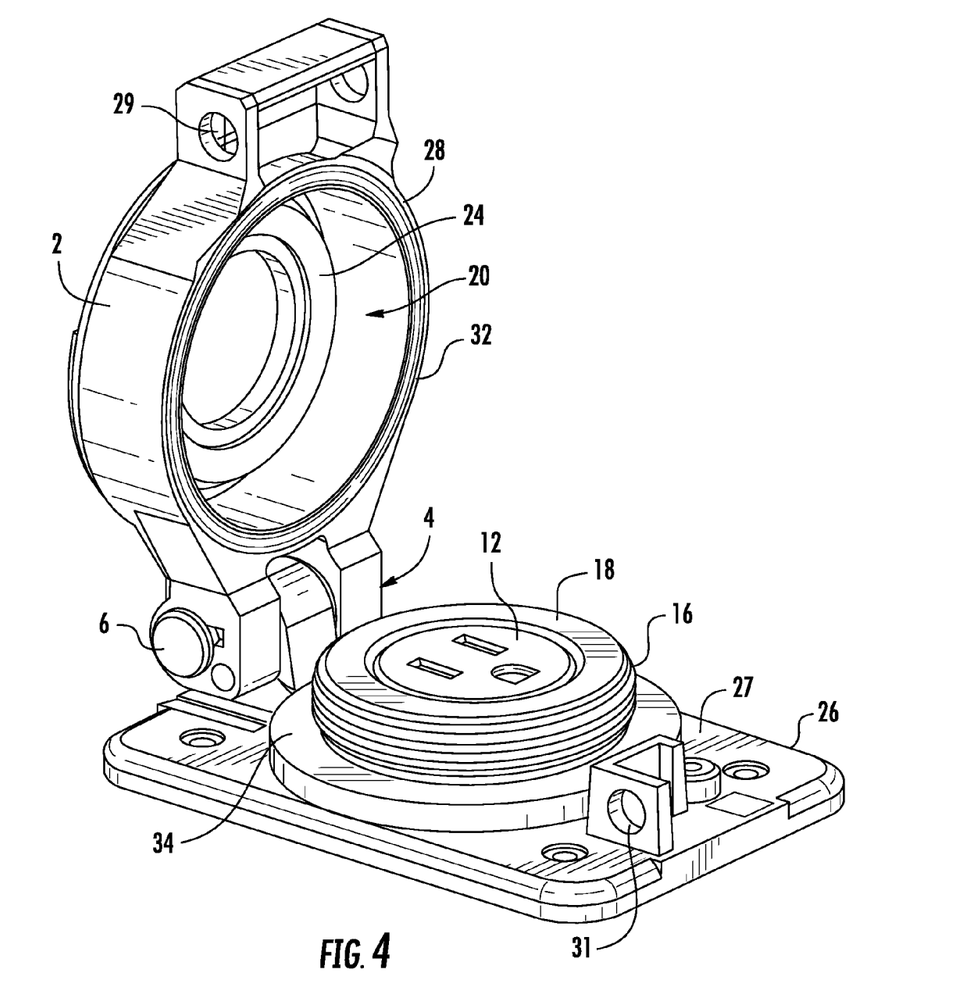
FIG. 4 is a perspective view of a portion of the electrical box of FIG. 1 including the disclosed flip lid cover.
Figure 5:
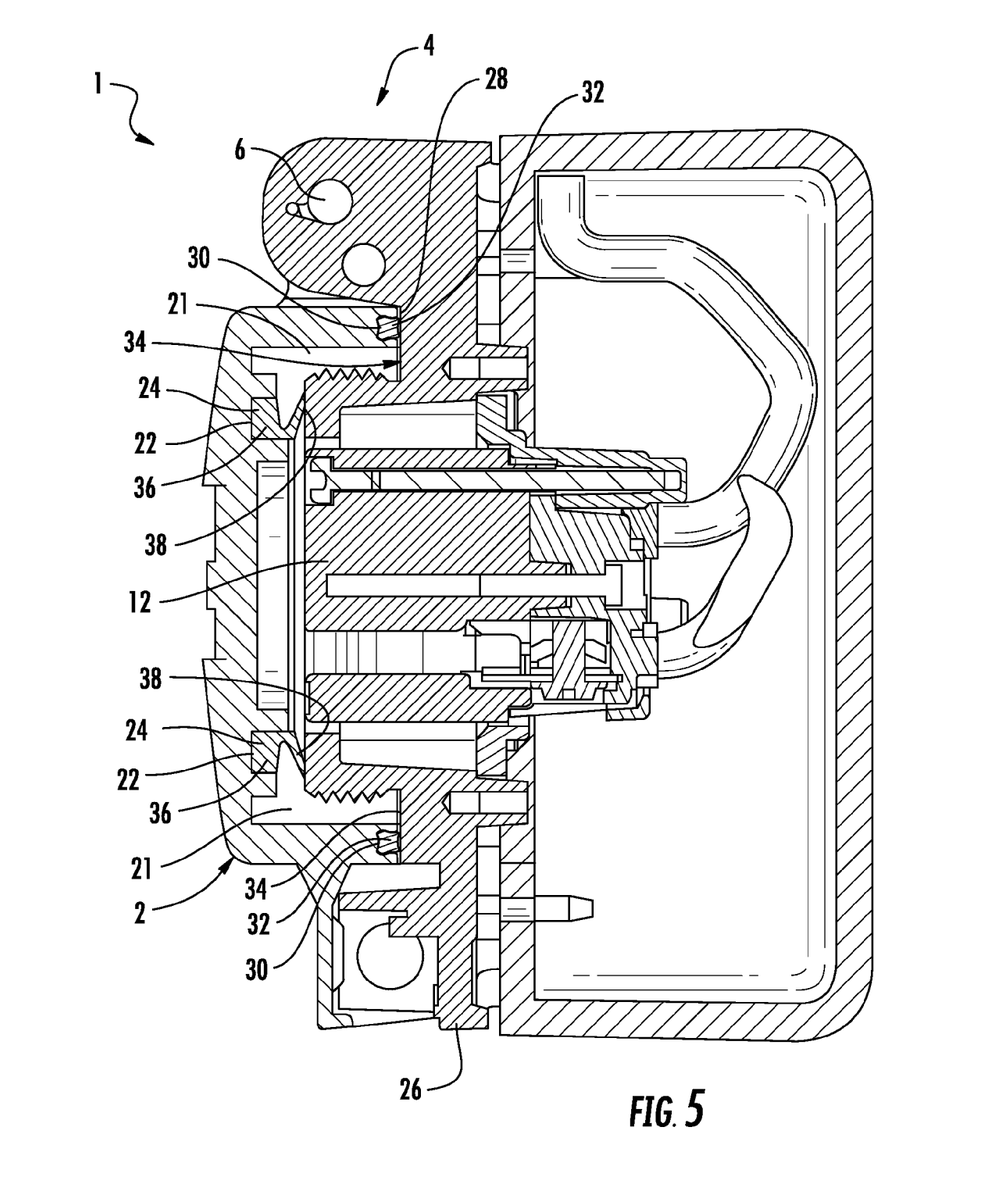
FIG. 5 is a cross-section view of the electrical box of FIG. 1 taken along line 5-5 of FIG. 1.

Referring now to FIGS. 4 and 5, the disclosed sealing arrangement between the electrical box 1 and the flip lid cover 2 will be described in greater detail. In FIG. 4, the flip lid cover 2 is shown in the open configuration so that the receptacle 12 is accessible. The electrical box 1 is not shown in its entirety in this view, rather only the lid portion 26 of the electrical box is shown. The flip lid cover 2 may include an inner recess 20 sized and configured to receive a portion of the receptacle 12 therein. The inner recess 20 can further include a first seal recess 22 (FIG. 5) for receiving a first seal 24 therein. The inner recess 20 is also preferably sized and configured to receive the first sealing surface 18 and the threaded portion 16. In one non-limiting exemplary embodiment, the first seal 24 is a Type A, V-ring seal. It will be appreciated that other types of seals can also be used, a non-limiting listing of which includes Types S, L and E V-rings, an O-ring, an X-ring, a hollow O-ring, a square ring, a simmering inflatable (i.e., air pocket) seal, a gasket, a formed in place gasket, or the like. The first seal recess 22 can be a circular recess having a square, circular or dovetail cross-section for receiving the circular first seal 24, and can be positioned so that when the flip lid cover 2 is in the closed configuration, the first seal engages, and seals against, the first sealing surface 18 formed on the electrical box 1. In the illustrated embodiment, the first sealing surface 18 is an integral part of the lid portion 26 of the electrical box 1, though this is not necessary.

The flip lid cover 2 may further include a perimeter face 28 that includes a second seal recess 30 (FIG. 5) for receiving a second seal 32 therein. In one non-limiting exemplary embodiment, the second seal 32 can be an O-ring, an X-ring, a V-ring, a hollow O-ring, a square ring, a Simmering, an inflatable (i.e., air pocket) seal, a gasket, a formed in place gasket, or the like. The second seal recess 30 can be a circular recess for receiving the circular second seal 32, and can be positioned so that when the flip lid cover 2 is in the closed configuration the second seal engages, and seals against, a corresponding second sealing surface 34 formed on the lid portion 26. In the illustrated embodiment, the second sealing surface 34 is a circumferential region surrounding the male threaded portion 16 of the electrical box 1. The first sealing surface 18 and the second sealing surface 34 are preferably substantially flat surfaces, and may each have a width sufficient to facilitate repeatable sealing engagement with respective first and second seals 24, 32. In some embodiments one or both of the first and second sealing surfaces can have a surface finish of about 16-125 Ra (average roughness in microinches).

Although the illustrated embodiments show the first and second seals 24, 32 fixed to corresponding first and second recesses 22, 30 of the flip lid cover 2, it will be appreciated that the first and/or second seals could alternatively be fixed to respective recesses in the lid portion 26 of the electrical box 1. In such embodiments, where one or both of the first and second seals 24, 32 is coupled to the lid portion 26, the associated first and/or second sealing surfaces 18, 34 would be formed on or within respective portions of the flip lid cover 2.

In the illustrated embodiment, the first sealing surface 18 and the receptacle 12 may project or extend away from the second sealing surface 34 and the upper surface 27 (FIG. 4) of the lid portion 26 by a first distance. In addition, the second sealing surface 34 may project or extend away from the upper surface 27 of the lid portion 26 by a second distance, where, as shown, the first distance is greater than the second distance. It will be appreciated that this offset relationship between the surfaces is not necessary, and in other exemplary embodiments the first sealing surface 18, second sealing surface 34 and upper surface 27 could be co-planar, or could have other relative offsets, including recesses, as desired.

As shown in FIG. 4, the flip lid cover 2 may also include an opening 29 that corresponds to an opening 31 formed on the lid portion 26. Thus arranged, when the flip lid cover 2 is positioned in the closed configuration, a locking element can be inserted through the openings 29, 31 to prevent tampering or unauthorized access to the receptacle 12.

Figure 6:
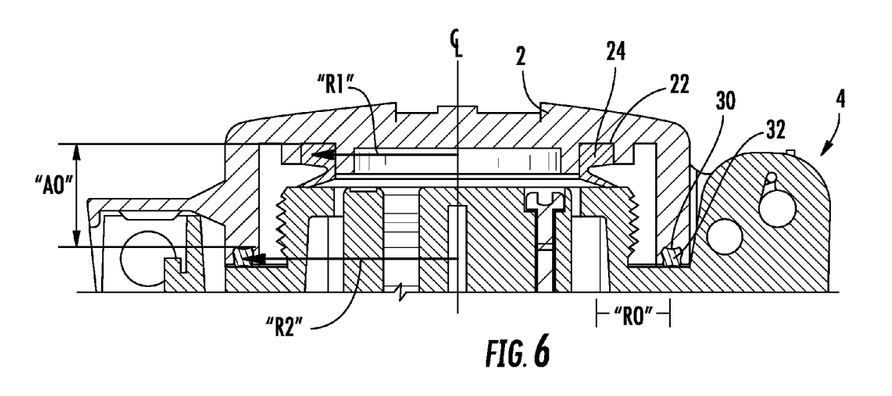
FIG. 6 is a portion of the cross-section view of FIG. 5 showing the offset arrangement of the first and second seals.

As best illustrated in FIG. 6, the first and second seal recesses 22, 30 may be concentric so that the first and second seals 24, 32 are concentric (although in other embodiments, they don't need to be concentric). The first recess 22 may have a radius "R1" that is smaller than the radius "R2" of the second recess 30 so that the first and second seal recesses 22, 30 (and the first and second seals 24, 32) are radially offset with respect to each other by a radial offset "RO." Further, in some embodiments the second seal recess 30 may be positioned axially forward with respect to the first seal recess 22 (i.e., closer to the electrical box 1) by an axial offset distance "AO," so that the first seal 24 engages the first sealing surface 18 and the second seal 32 engages the second sealing surface 34 of the lid portion 26. As arranged, when the flip lid cover 2 is configured in the closed configuration, the first and second seals 24, 32 engage the first and second sealing surfaces 18, 34, respectively, to provide a dual sealing arrangement for protecting the receptacle 12 from ingress of moisture, dust or other unwanted contaminants.

The first and second seals 24, 32 may be engaged with the respective first and second seal recesses 22, 30 formed in the flip lid cover 2 in a press-fit manner (i.e., by squeezing the elastomeric material of the first or second seal and inserting it into the respective first or second recesses. Alternatively the first and second seals 24, 32 may be fixed to the respective first and second seal recesses 22, 30 using any other method, now or hereafter known, including an appropriate adhesive or lubricant.

Figure 7:
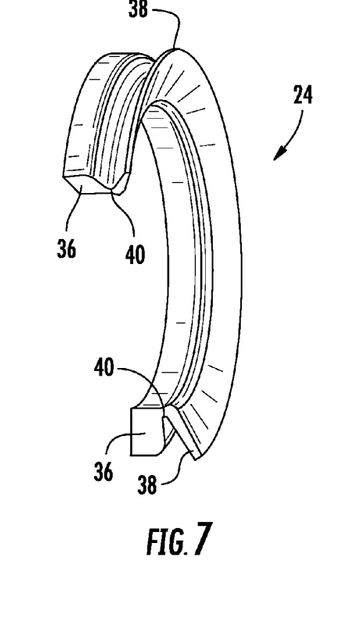
FIG. 7 is a cutaway view of an exemplary V-ring of the disclosed weather resistant flip lid cover.

FIG. 7 shows an exemplary V-ring preferably for use as the first seal 24. The illustrated V-ring 24 includes a body portion 36, a lip portion 38 and a living hinge portion 40. As best illustrated in FIG. 5, the body portion 36 is received within the first recess 22 formed in the flip lid cover 2 while the lip portion 38 protrudes from the first recess 22 so that it is presented axially toward the first sealing surface 18. Thus arranged, the lip portion 38 contacts the first sealing surface 18 when the flip lid cover 2 is rotated into the closed configuration. As the lip portion 38 engages the first sealing surface 18 it flexes about the hinge portion 40, thereby increase the sealing area between the lip portion 38 and the first sealing surface 18.

FIG. 5 further illustrates that when the V-ring 24 is coupled to the flip lid cover 2, a portion of the V-ring seal 24 is exposed to an inner air chamber 21 that is formed between the flip lid cover 2 and the electrical box 1 when the flip lid cover 2 is in the closed configuration. Specifically, the open "V" portion of the V-ring 24 is preferably oriented radially outwardly so that it is exposed to the atmosphere of the inner air chamber 21. As such, when the flip lid cover 2 is moved from the open configuration to the closed configuration, the inner air chamber 21 experiences a slight pressure increase due to the compression of the air within the inner air chamber. This slight pressure increase acts against the open "V" portion and thereby presses the lip portion 38 of the V-ring 24 against the first sealing surface 18, enhancing the seal between the V-ring 24 and the first sealing surface 18. This arrangement thus enhances protection of the receptacle 12 against ingress of unwanted moisture or particulate matter. Furthermore, if any water manages to pass the second seal 32, the water will likewise tend to press against the open "V" portion of the V-ring 24, pressing the lip portion 38 of the V-ring 24 against the first sealing surface 18, enhancing the seal between the V-ring 24 and the first sealing surface 18. Again, this enhances protection of the receptacle 12 against ingress of unwanted moisture or particulate matter.

As will be appreciated, using a V-ring as the first seal 24 overcomes the limitation of prior gaskets, which as mentioned, may be unable to seal gaps which can form between the hinge side of the seal and the non-hinge side of the seal. With the disclosed arrangement, the lip portion 38 provides an enhanced degree of flexibility, which enables it to close gaps of up to, for example, ⅛" (3 mm). Thus, the lip portion 38 is conformable to the first sealing surface 18 within a wide positional tolerance of the flip lid cover 2. It will be appreciated that the disclosed arrangement may result in a long lasting seal that experiences minimal deterioration with repeated use.

Figure 8:
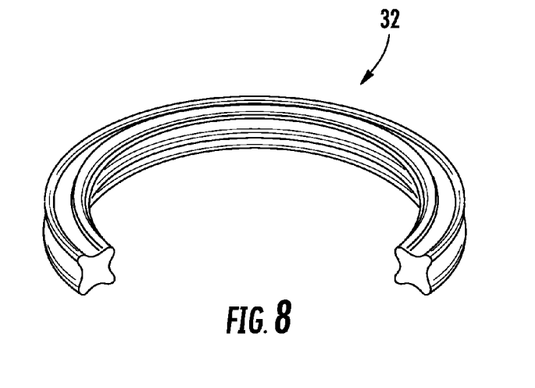
FIG. 8 is a cutaway view of an exemplary X-ring of the disclosed weather resistant flip lid cover.

FIG. 8 shows exemplary X-ring preferably for use as the second seal 32. As previously noted, the second seal need not be limited to an X-ring, and instead can be a solid O-ring, a hollow O-ring, a gasket, a formed-in-place gasket, a Simmering, a V-ring, a lip seal, an inflatable (i.e., air pocket) seal, or other appropriate seal. The first and second seals 24, 32 can be made from an elastomeric material. In one embodiment, the first and second seals 24, 32 are made from the same type of elastomer, while in other embodiments the first and second seals can be made from different elastomeric compositions and/or hardnesses. It will be appreciated that the choice of elastomeric material used for the first and second seals 24, 32 may be selected to best suit the environment in which the electrical box 1 will be subjected. A non-limiting exemplary listing of suitable elastomeric materials for the first and second seals 24, 32 include rubber, nitrile, butadiene, synthetic rubber including ethylene-propylene (EPM, EPR, EPDM), nitrile rubber (NBR), Hydrogenated Nitrile Butadiene Rubber (HBNR), highly saturated nitrile rubber (HSN), neoprene, chloroprene, VMQ or PVMQ silicone rubber, polyester urethane (AU), polyether urethane (EU); fluoropolymer, FVMQ fluorosilicone, fluoromethyl ketone (FMK, FFMK) or a combination thereof. In non-limiting exemplary embodiments the first and second seals 24, 32 can also have hardnesses of between 40-90 Shore A. In addition, for some embodiments, the elastomeric material used for the first and/or second seals 24, 32 can have a desired degree of oil and/or chemical resistance.

Figure 9:
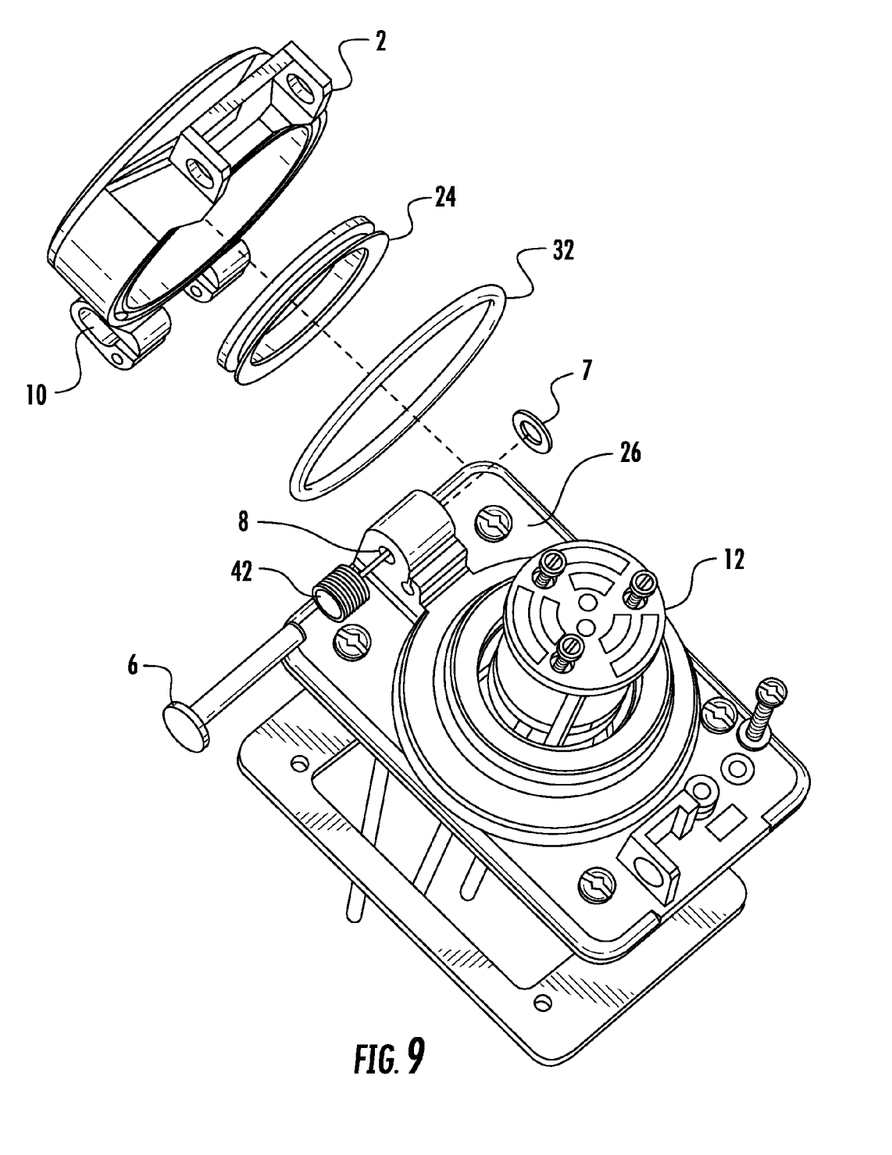
FIG. 9 is an exploded view of a portion of the electrical box of FIG. 1 including the disclosed flip lid cover.

FIG. 9 is an exploded view of the disclosed flip lid cover 2, with first and second seals 24, 32, lid portion 26, and receptacle 12. Again, in this view the entire electrical box 1 is not shown, simply the lid portion 26. As can be seen, pivot pin 6 can be received within respective recesses 8, 10 formed in the lid portion 26 and flip lid cover 2, respectively, and can be secured via a retaining washer 7. In addition, a spring 42 can be disposed about the pivot pin 6 within one or more of the recesses 8, 10 formed in the flip lid cover 2 or lid portion 26, respectively (alternately, spring 42 doesn't need to be disposed within one of the recesses 8, 10). Preferably, the spring 42 is disposed within the recess 10 formed in the flip lid cover 2. The spring 42 biases the flip lid cover 2 in the closed configuration. Providing a spring-biased flip lid cover 2 can enhance the sealing force applied to the first and second seals 24, 32. Thus arranged, when the flip lid cover 2 is released (such as when the electrical plug 14 is disconnected from the receptacle 12), the flip lid cover automatically rotates about the hinge 4 (FIG. 1) to assume the closed configuration, engaging the first and second seals 24, 32 with their respective first and second sealing surfaces 18, 34 and sealing the receptacle 12 from the ingress of unwanted moisture, particulate and the like. This can be advantageous because it minimizes the need for additional operator action to effect a seal that is compliant with NEMA Type 4, Type 12, and/or IP66 requirements. For example, no affirmative or additional locking mechanism is required. Alternatively, in some embodiments, it is not necessary that the spring 42 be employed, and instead the weight of the flip lid cover 2 alone may be sufficient to bias/seat the first and second seals 24, 32 against their respective first and second sealing surfaces 18, 34.

The electrical box 1, including the lid portion 26, and the flip lid cover 2 may be made from a suitable metal material, a non-limiting example of which can include aluminum, stainless steel, steel and brass. Alternatively, one or more of these components can be made from a suitable non-metallic material such as a thermoset polymer, a thermoplastic polymer or a ceramic.

Figure 10:
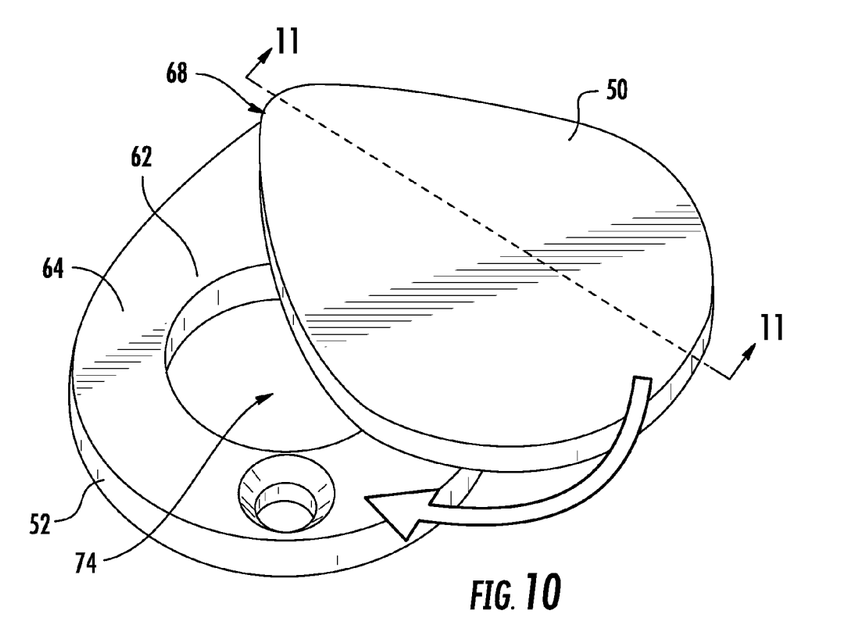
FIG. 10 is a perspective view of an alternative weather resistant flip lid cover in accordance with the disclosure.
Figure 11:
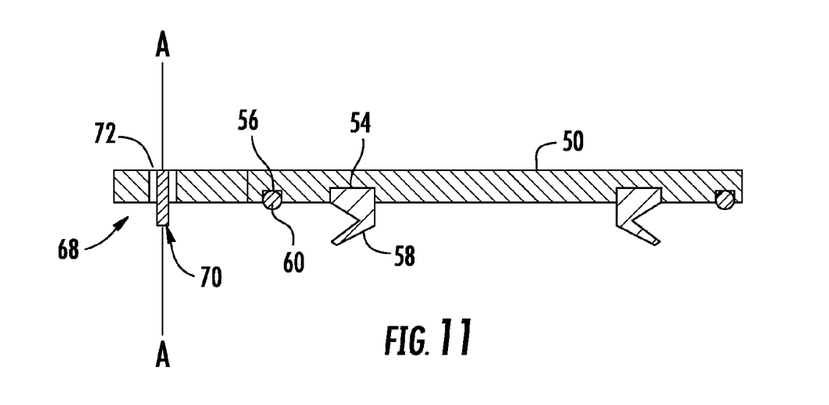
FIG. 11 is a cross-section view of the weather resistant flip lid cover of FIG. 10, taken along line 11-11 of FIG. 10.

FIGS. 10 and 11 illustrate an alternative weather resistant lid cover 50 in accordance with the disclosure. The lid cover 50 is shown in the open configuration so that the receptacle (not shown) is accessible. The associated electrical box, which can be similar to the electrical box 1 described in relation to FIGS. 1 and 2, is not shown in its entirety in this view, rather only the lid portion 52 of the electrical box is shown. The lid cover 50 of this embodiment may include first and second seal recesses 54, 56 for receiving first and second seals 58, 60 therein. In one non-limiting exemplary embodiment, the first seal 58 is a Type A, V-ring, while the second seal 60 is an O-ring or an X-ring. It will be appreciated that other types of seals can also be used for the first and/or second seal 58, 60, a non-limiting listing of which includes Types S, L and E V-rings, an O-ring, an X-ring, a hollow O-ring, a square ring, a Simmering, an inflatable (i.e., air pocket) seal, a gasket, a formed in place gasket, or the like.

The first and second seal recesses 54, 56 can be circular recesses for receiving the circular first and second seals 58, 60, respectively, and can be positioned so that when the lid cover 50 is in the closed configuration, the first and second seals engage, and seal against, first and second sealing surfaces 62, 64 formed on the lid portion 52. In the illustrated embodiment, the first and second sealing surfaces 62, 64 are contiguous and are an integral part of the lid portion 52, though this is not necessary.

The first and second sealing surfaces 62, 64 may be substantially flat surfaces, and may have relative widths sufficient to facilitate repeatable sealing engagement with the first and second seals 58, 60. In some embodiments, one or both of the first and second sealing surfaces can have a surface finish of about 16-125 Ra (average roughness, in microinches).

The lid cover 50 can be pivotably engaged with the lid portion 52 via a pivot joint 68, which in the illustrated embodiment includes a pin 70 received within a pin recess 72 in the lid cover 50 and a corresponding recess (not shown) in the lid portion 52. Contrary to the flip lid cover 2 illustrated in the first exemplary embodiment, the pivot joint 68 in the second exemplary embodiment may have a pivot axis A-A oriented perpendicular to the first and second sealing surfaces 62, 64. FIG. 10 shows the lid cover 50 in an open configuration in which the lid cover is rotated away from the electrical box lid portion 52 about the pivot joint 68 so that a receptacle (not shown, but which may be disposed in a central opening 74 of the lid portion 52 of the electrical box. To position the lid cover 50 in the closed configuration, the lid cover 50 can be rotated about the pivot joint 68 in the direction of arrow "A," until the first and second seals 58, 60 engage the first and second sealing surfaces 62, 64, thereby effecting a seal that is compliant with NEMA Type 4, Type 12, and/or IP66 requirements. The lid cover 50 may include and provide any or all of the features and advantages described in relation to the embodiment shown in FIGS. 1-9. For example, in some embodiments the lid cover 50 may be spring biased in the closed configuration.

While certain embodiments of the disclosure have been described herein, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision additional modifications, features, and advantages within the scope and spirit of the claims appended hereto.

What is claimed is:

1. A weather resistant cover for an electrical box or connector, comprising:
    a flip lid cover including a first seal recess for receiving a first seal, and a second seal engaging surface for engaging a second seal, the flip lid cover further including a hinge for pivotably coupling to a portion of an electrical box or connector;
    the first seal recess having a first radius that is smaller than a radius of the second seal engaging surface;
    wherein when the flip lid cover is in a closed configuration the first and second seals are engageable with first and second sealing surfaces, respectively, of the electrical box or connector; and
    wherein the first seal is a V-ring having a lip portion and a body portion connected to the lip portion, the lip portion positioned to engage the first sealing surface when the flip lid cover is in the closed configuration; and
    wherein when the flip lid cover is configured in the closed configuration an inner chamber is formed between the V-ring and the second seal.

2. The weather resistant cover of claim 1, wherein the electrical box or connector includes a protruding face configured to at least partially surround an electrical wiring device, the protruding face comprising the first sealing surface; and the second sealing surface being positioned on a portion of the electrical box or connector other than the protruding face.

3. The weather resistant cover of claim 1, wherein the second seal is selected from the list consisting of a solid O-ring, a hollow O-ring, a square ring, a gasket, a formed-in-place gasket, a Simmering, a V-ring, a lip seal, and an inflatable seal, and wherein the second seal engaging surface is disposed on a perimeter face of the flip lid cover.

4. The weather resistant cover of claim 1 wherein a biasing force of the flip lid cover is sufficient to form a seal between the V-ring and the first sealing surface such that water is prevented from entering the electrical box or connector.

5. The weather resistant cover of claim 4, further comprising a spring coupled to the hinge to bias the flip lid cover in the closed configuration.

6. The weather resistant cover of claim 1, wherein the first sealing surface is configured to surround a portion of an electrical wiring device such that when the flip lid cover is in the closed configuration the flip lid cover and the V-ring at least partially enclose the electrical wiring device, and wherein when the flip lid cover is rotated about the hinge into an open configuration the electrical wiring device is accessible for connection to an electrical plug or connector.

7. The weather resistant cover of claim 1, wherein the first and second sealing surfaces are substantially flat.

8. The weather resistant cover of claim 1, wherein the first and second sealing surfaces are integral portions of the electrical box or connector.

9. A weather resistant cover for an electrical box or connector, comprising:
    a flip lid cover comprising first and second seal recesses, the first seal recess for receiving a first seal, the second seal recess for receiving a second seal, the first seal comprising a V-ring having a lip portion and a body portion, the lip portion coupled to the body portion, the flip lid cover further comprising a hinge for pivotably coupling to a portion of the electrical box or connector;
    wherein when the flip lid cover is rotated about the hinge to a closed configuration with respect to the electrical box or connector, the first and second seals are engageable with respective first and second sealing surfaces of the electrical box or connector;
    wherein the flip lid cover is biased to form a seal between the lip portion of the V-ring and the first sealing surface such that water is prevented from entering the electrical box or connector; and
    wherein when the flip lid cover is configured in the closed configuration an inner chamber is formed between the V-ring and the second seal.

10. The weather resistant cover of claim 9, wherein the electrical box or connector includes a protruding face, the protruding face comprising the first sealing surface, the second seal recess being positioned closer to the electrical box or connector than the first seal recess such that the second seal engages the second sealing surface adjacent an upper surface of the electrical box or connector as the V-ring engages the first sealing surface.

11. The weather resistant cover of claim 9, wherein the second seal is selected from the list consisting of a solid O-ring, a hollow O-ring, a square ring, a gasket, a formed-in-place gasket, a Simmering, a V-ring, a lip seal, and an inflatable seal.

12. The weather resistant cover of claim 9, wherein the first and second recesses are concentric.

13. The weather resistant cover of claim 9, further comprising a spring coupled to the hinge to bias the flip lid cover in the closed configuration.

14. The weather resistant cover of claim 9, wherein the first and second sealing surfaces are substantially flat.

15. A weather resistant cover for an electrical box or connector, comprising:

a flip lid cover comprising first and second seal recesses, the first seal recess for receiving a first seal, the second seal recess for receiving a second seal, the first seal comprising a V-ring having a lip portion and a body portion, the lip portion coupled to the body portion, the flip lid cover further comprising a hinge for pivotably coupling to a portion of an electrical box or connector such that the flip lid cover is movable between an open configuration and a closed configuration with respect to the electrical box or connector;

wherein when the flip lid cover is in the closed configuration the first and second seals are engageable with respective first and second sealing surfaces of the electrical box or connector to form an inner air chamber therebetween, and wherein when the flip lid cover is moved from the open configuration to the closed configuration, a pressure in the inner air chamber is increased and presses the lip portion of the V-ring against the first sealing surface.

16. The weather resistant cover of claim 15, wherein the flip lid cover is biased to the closed configuration to form a seal between the V-ring and the first sealing surface such that water is prevented from entering the electrical box or connector.

17. The weather resistant cover of claim 16, wherein a biasing force of the flip lid cover is sufficient to form a seal between the V-ring and the first sealing surface such that water is prevented from entering the electrical box or connector.

18. The weather resistant cover of claim 16, further comprising a spring coupled to the hinge to bias the flip lid cover in the closed configuration.

19. The weather resistant cover of claim 15, wherein the first sealing surface surrounds at least a portion of an electrical wiring device such that when the flip lid cover is in the closed configuration the flip lid cover and the V-ring at least partially enclose the electrical wiring device, and wherein when the flip lid cover is rotated about the hinge to an open configuration the electrical wiring device is accessible for connection to an electrical plug or connector.

20. The weather resistant cover of claim 15, the electrical box or connector having a protruding face, the protruding face comprising the first sealing surface, the second seal recess being positioned axially forward with respect to the first seal recess such that the second seal engages the second sealing surface adjacent a surface of the electrical box or connector other than the protruding face as the V-ring engages the first sealing surface.

21. The weather resistant cover of claim 15, wherein the second seal is selected from the list consisting of a solid O-ring, a hollow O-ring, a square ring, a gasket, a formed-in-place gasket, a Simmering, a V-ring, a lip seal, and an inflatable seal.

22. The weather resistant cover of claim 15, wherein the first and second sealing surfaces are substantially flat.

23. The weather resistant cover of claim 15, wherein when the flip cover is configured in the closed configuration an inner chamber is formed between the V-ring and the second seal such that fluid ingress past the second seal into the inner chamber presses the lip portion of the V-ring against the first sealing surface to increase a sealing force of the lip portion against the first sealing surface.

* * * * *